United States Patent
Kim et al.

(10) Patent No.: US 7,684,403 B2
(45) Date of Patent: Mar. 23, 2010

(54) EPON BRIDGE APPARATUS AND METHOD FOR FORWARDING THEREOF

(75) Inventors: Chan Kim, Daejeon (KR); Tae Whan Yoo, Daejeon (KR); Yool Kwon, Busan (KR); Bong-Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 528 days.

(21) Appl. No.: 11/514,561

(22) Filed: Sep. 1, 2006

(65) Prior Publication Data

US 2008/0198857 A1    Aug. 21, 2008

(30) Foreign Application Priority Data

Sep. 5, 2005    (KR) ...................... 10-2005-0082443

(51) Int. Cl.
*G01R 31/08* (2006.01)
(52) U.S. Cl. ...................... 370/392; 370/216
(58) Field of Classification Search ............ 370/392
See application file for complete search history.

(56) References Cited

U.S. PATENT DOCUMENTS

| 6,501,579 | B2 | 12/2002 | Li et al. | |
| 6,804,471 | B1 | 10/2004 | Ionov et al. | |
| 6,967,949 | B2* | 11/2005 | Davis et al. | 370/390 |
| 7,286,538 | B2 | 10/2007 | Song et al. | |
| 2003/0117998 | A1* | 6/2003 | Sala et al. | 370/351 |
| 2003/0190168 | A1* | 10/2003 | Song et al. | 398/168 |
| 2003/0235205 | A1* | 12/2003 | Song et al. | 370/466 |
| 2004/0109450 | A1* | 6/2004 | Kang et al. | 370/390 |
| 2005/0002390 | A1* | 1/2005 | Kim et al. | 370/389 |
| 2005/0058118 | A1 | 3/2005 | Davis et al. | |
| 2005/0220129 | A1* | 10/2005 | Boyd | 370/428 |

FOREIGN PATENT DOCUMENTS

| KR | 1020030047966 |   | 6/2003 |
| KR | 1020040025355 | A | 3/2004 |
| KR | 1020040057869 |   | 7/2004 |
| KR | 1020050027644 | A | 3/2005 |
| KR | 100636383 |   | 10/2006 |
| KR | 100687752 |   | 2/2007 |

* cited by examiner

*Primary Examiner*—Dang T Ton
*Assistant Examiner*—Frederick Ott
(74) *Attorney, Agent, or Firm*—Ladas & Parry LLP (57) ABSTRACT

The invention relates to an EPON bridge apparatus and a forwarding method thereof. In a case of receiving a frame from the network port or the PON port, the apparatus associates the port having the received frame inputted with a source MAC address of the received frame to learn the information in an FDB table, which manages port information for the learned MAC address. Then the apparatus refers to the FDB table to remove an LLID from upstream frame, and then forwards the upstream frame to the network port, while attaching an LLID corresponding to a destination MAC address to the downstream frame to transmit to the PON port. Bridging between ONUs is possible with flooding capability using an anti-LLID. VLAN-LLID translation mode is provided with support for VLAN tag addition/removal at the ONU side. A multicast pruning function is provided for the downstream.

35 Claims, 9 Drawing Sheets

| 0 | VTAG-TCI(15:0) |
|---|---|
| 0 | VTAG-TCI(15:0) |
| 0 | VTAG-TCI(15:0) |
| 0 | VTAG-TCI(15:0) |
| 0 | VTAG-TCI(15:0) |

| 0 | VTAG-TCI(15:0) |
|---|---|

} 64 entries

EPON BRIDGE APPARATUS AND METHOD FOR FORWARDING THEREOF

CLAIM OF PRIORITY

This application claims the benefit of Korean Patent Application No. 2005-82443 filed on Sep. 5, 2005, in the Korean Intellectual Property Office, the disclosure of which is incorporated herein by reference.

BACKGROUND OF THE INVENTION

1. Field of the Invention

The present invention relates to an Ethernet Passive Optical Network (EPON) bridge apparatus which executes bridging between a network port coupled to an upper network and a PON port, which is present in a PON side, and includes a plurality of logical links identified by Logical Link Identification (LLID), and a forwarding method thereof.

2. Description of the Related Art

Figure 1:
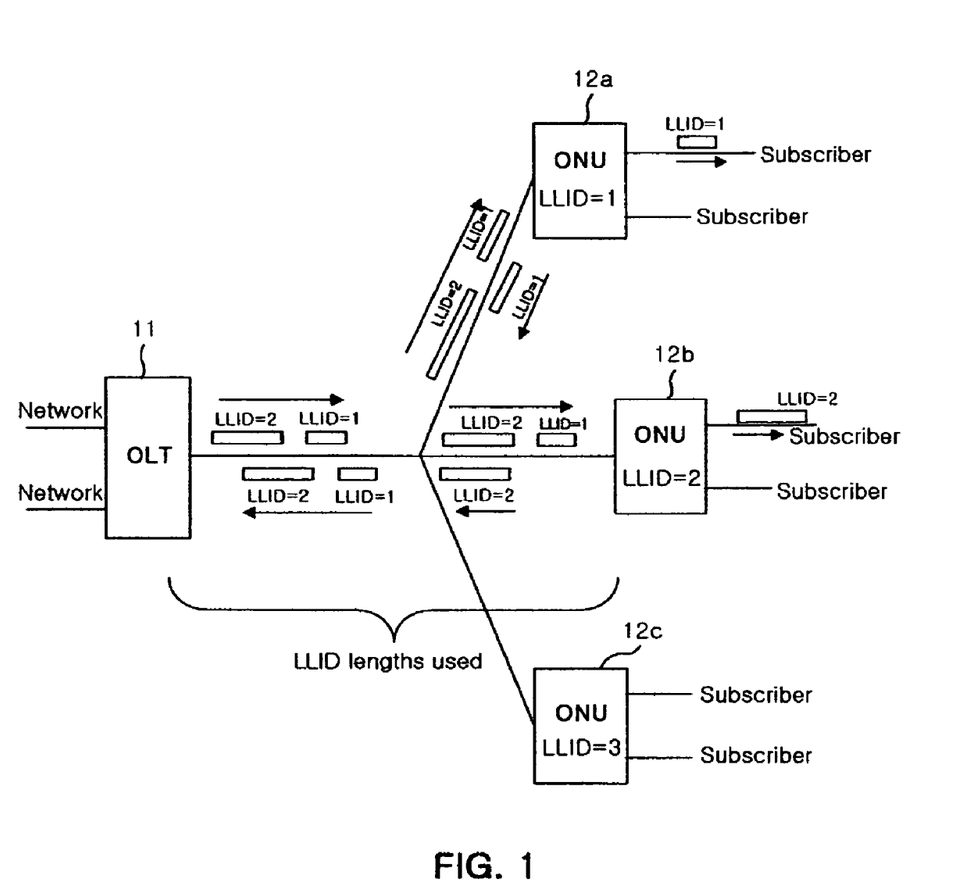
FIG. 1 is a configuration of an EPON structure.

An Ethernet Passive Optical Network (Ethernet-PON, hereinafter referred to as EPON) was standardized by the IEEE 802 group. The EPON, as shown in FIG. 1, features a passive connection between an optical line terminal (OLT) 11, coupled to a network side, and a plurality of Optical Network Units (ONU) 12a-12c, coupled to a subscriber side through an optical splitter (not illustrated). Within the EPON, data is transferred by a unit equal to that of the existing Ethernet frame. To achieve compatibility with the upper layer bridge, a Logical Link Identification (LLID) for identifying the ONUs 12a-12c is used in the 8 byte preamble of Ethernet frame, which is attached when transmitted.

The LLID of an Ethernet frame transferred to the ONUs 12a-12c (hereinafter referred to as a downstream frame) is a destination LLID signifying an ONU to which the transfer is to be made, whereas the LLID of the Ethernet frame transferred to the OLT 11 (hereinafter referred to as an upstream frame) is a source LLID signifying an ONU from which the transfer has been made. The upstream frame and the downstream frame are transmitted through different wavelengths. When the downstream frame is sent to all ONUs 12a-12c, each ONU 12a-12c identifies the LLID of the downstream frame, and each of the ONUs 12a-12c, to which the downstream frame is headed according to the LLID of the downstream frame, selectively receives the downstream frame. The LLID of the downstream frame may allow all ONUs except for a specific ONU to receive data, or all ONUs to receive data, or a specific multicast group to receive data.

Meanwhile, the upstream frame is sent to the OLT 11. To prevent signal overlapping between the upstream frames of the ONUs 12a-12c, the OLT 11 arbitrates upstream transmission times of the ONUs 12a-12c while allocating permitted transmission time to be used in each of the ONUs 12a-12c at the same time according to the bandwidth usage requests coming from the ONUs.

Figure 2:
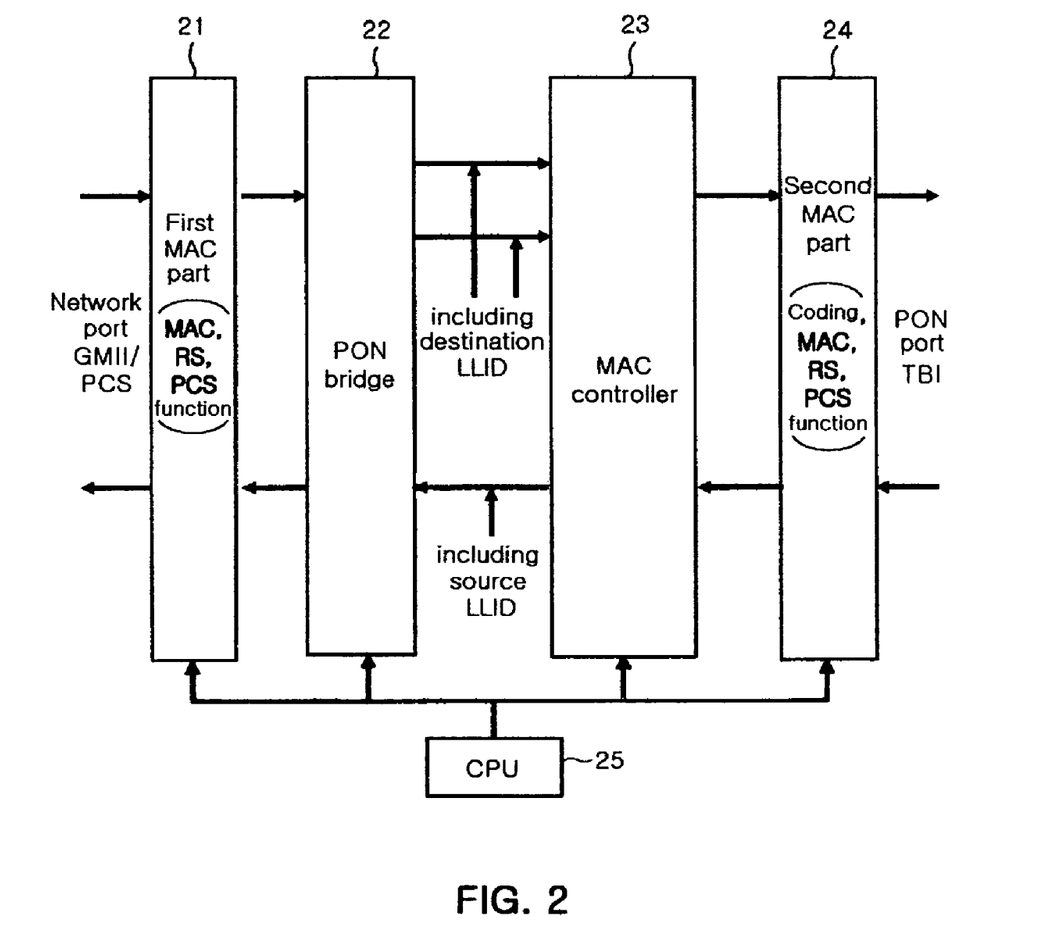
FIG. 2 is a block diagram illustrating an EPON master apparatus mounted on an OLT of an EPON.

Therefore the OLT 11 executes bridging between the upper network and lower PON via an EPON master apparatus as shown in FIG. 2.

In reference to FIG. 2, the EPON master apparatus comprises a first MAC 21 part connected to the upper network and adapted to transmit/receive frames to/from the upper network and execute MAC, RS, and PCS functions in connection therewith; a PON bridge 22 adapted to transmit/receive Ethernet frames between the upper network and lower PON to achieve compatibility with the upper layer via the LLID; a MAC controller 23 adapted to process the multipoint control protocol (MPCP) data, demultiplex and multiplex frames and execute grant scheduling for each LLID and auto-discovery for the ONUs; a second MAC part 24 connected to a physical interface in the PON side and adapted to create and inspect a Frame Check Sequence (FCS) for a frame transmitted or received to/from the PON and transmit/receive frame to/from the physical layer; and a CPU 25 adapted to control overall operation of the EPON master apparatus and process frames pertaining to control out of the transmitted/received frames.

The first and second MAC parts 21, 24 described above may not have coding or PCS function.

The EPON network structure is not supported by conventional Ethernet, and if Ethernet of different network structure is connected thereto, the OLT 11 should perform not only bridging between the terminals in the ONUs and terminals in the attached Ethernet but also bridging among the terminals attached to the ONUs within the EPON.

Further, an Ethernet bridge can connect two or more LANs. A bridge port can be connected with another bridge or directly connected with a terminal or router. Therefore, in a case where the OLT 11 is connected to an Ethernet bridge, the EPON may be regarded as a Local Area Network (LAN) or a plurality of Virtual Local Area Networks (VLAN)s from the standpoint of an external Ethernet bridge.

VLAN is used to prevent frames from being broadcast among LAN segments not required to communicate with each other when a bridged network is expanded and thus to reduce traffic of the whole network. VLAN is also used to limit transfer of a frame to a specified group for security. If VLAN is used, an Ethernet frame has a mark indicating to which VLAN the frame belongs (hereinafter called VLAN tag, in the VLAN tag, there are VID (VLAN ID), the VLAN identifier, as well as priorities of the frame). The VLAN tag may be attached while a frame is sent from a terminal. But typically the VLAN tag is attached by port or protocol in the entrance of network.

In addition, a multicast frame can be transferred to a specified subscriber from an Ethernet bridge.

As a result, the OLT 11, especially a PON bridge 22 of the EPON master apparatus should identify the ONUs 12a-12c as a LAN to bridge a frame transmitted/received within the LAN. Alternatively the PON bridge 22 should identify the ONUs 12a-12c as a plurality of VLANs to transfer a frame according to VLAN rules. Moreover, the PON bridge 22 should be able to process multicast frames.

SUMMARY OF THE INVENTION

The present invention has been made to solve the foregoing problems of the prior art and it is therefore an object of the present invention to provide an EPON bridge apparatus capable of effectively executing bridging between an upper network port and a lower PON port having a plurality of logical ports identified by LLIDs and enabling a variety of linking methods, and a forwarding method thereof.

It is another objective of the invention to provide an EPON bridge apparatus adapted to enable a MAC address learning and bridging function among a plurality of logical links of the PON port identified by LLIDs based on MAC address, and the network port to make PON look like a LAN, and a forwarding method thereof.

It is further another object of the invention to provide an EPON bridge apparatus adapted to enable a PON to be processed as a plurality of VLANs from the viewpoint of the upper network and to enable a subscriber attached to an ONU with a specified LLID to maintain private VLAN tag while using VLAN tag used in the network, and a forwarding method thereof.

It is yet another objective of the invention to provide an EPON bridge capable of blocking unnecessary downstream multicast traffic and a forwarding method thereof.

According to an aspect of the invention for realizing the objective, there is provided a forwarding method of an Ethernet Passive Optical Network (EPON) bridge apparatus, which executes bridging between a network port and a PON port including a plurality of logical ports via Logical Link Identifier (LLID) assigned to an Optical Network Unit (ONU) in the PON, the method comprising steps of:

receiving a frame from the network port or the PON port;

associating the port through which the frame was received with the source MAC address of the received frame and recording that information to a forwarding database (FDB) table adapted to keep the port information for the MAC addresses;

searching the FDB table for the destination MAC address of the received frame to get the port information of the destination MAC address;

(i) forwarding the received frame to the network port after removing the LLID therefrom, if the upstream frame's destination MAC address is looked up to be present in the network port; and (ii) forwarding the received frame to the PON port after adding the LLID corresponding to destination MAC address to the received frame, if upstream or downstream frame's destination MAC address is looked up to be present in the lower PON port. In addition, in a case where destination of the downstream frame is in the network port or destination of the upstream frame is in the same LLID of the input port, the frame is discarded.

According to another aspect of the invention for realizing the object, there is provided an Ethernet Passive Optical Network (EPON) bridge apparatus for executing bridging between a network port and a PON port including a plurality of logical ports via an LLID assigned to each Optical Network Unit (ONU) of the PON, comprising: an FDB table adapted to keep a MAC address and associated port information for the learned MAC addresses, and the LLID value corresponding to the MAC address if the port is in the PON side; a downstream input buffer adapted to store downstream frames inputted from the network port until the network port and the PON port are bridged; a downstream lookup and learner adapted to read downstream frame stored in the downstream input buffer, learn the port information for the source MAC address of the downstream frame and record the learned information in the FDB table, attach a destination LLID corresponding to a destination MAC address of the downstream frame to the frame by referring to the FDB table; a downstream output buffer adapted to store downstream frames inputted from the downstream lookup and learner until the downstream frames are transmitted to the PON port; an upstream input buffer adapted to store upstream frames inputted from the PON port until the network port and the PON port are bridged; an upstream lookup and learner adapted to read upstream frames stored in the upstream input buffer, record the learned information in the FDB table by associating source MAC address of the upstream frame to the source LLID of the upstream frame from the PON port, refer to the FDB table to get the port information on the destination MAC address of the upstream frame, and if the port is in the network side, output the upstream frame to the upstream output buffer after removing the source LLID of the upstream frame, and if the port is in the PON side, reflect the upstream frame to the PON side interface after replacing the LLID with the new destination LLID; and an upstream output buffer adapted to store upstream frames outputted from the upstream lookup and learning block until the upstream frames are outputted to the network port.

According to still another aspect of the invention for realizing the object, there is provided an EPON bridge apparatus executing bridging between a network port and a PON port including a plurality of logical ports via LLID assigned to each Optical Network Unit (ONU), comprising: an FDB table adapted to keep MAC address and associated port information for learned MAC addresses, and the LLID value corresponding to the MAC address if the port is in the PON side; a VID-LLID conversion table adapted to keep the LLID value to be attached to downstream frame according to the input VID value; a LLID-VID conversion table adapted to keep the VLAN tag value to be added according to the input LLID for upstream frame; a multicast table adapted to store registered multicast addresses for a downstream frame with an LLID value corresponding thereto; a downstream input buffer adapted to store downstream frames inputted from the network port until the network port and the PON port are bridged; a downstream lookup and learning block adapted to read a downstream frame stored in the downstream input buffer, learn the port information for the source MAC address of the downstream frame, and record the learned information in the FDB table, refer to a destination MAC address and/or VLAN tag of the downstream frame, look up the FDB table, VID-LLID (where VID is a VLAN Identifier) conversion table and multicast table, selectively remove the VLAN tag, check the destination LLID and then send the downstream frame to output; a downstream input buffer adapted to store downstream frames inputted from the downstream frame processor until the downstream frames are transmitted to the PON port; an upstream input buffer adapted to store upstream frames inputted from the PON port until the network port and the PON port are bridged; an upstream frame processor adapted to read an upstream frame stored in the upstream input buffer, associate a source MAC address, a source LLID of the upstream frame from the PON port to record the information in the FDB table, refer to the FDB table, a LLID-VID conversion table and multicast table to send the frame to the destination port including the PON port after looking for the destination port or LLID value associated with the destination MAC address of the upstream frame, remove the LLID of the upstream frame and selectively attach a VLAN tag corresponding to the removed LLID to output the frame to the upstream output buffer; and an upstream output buffer adapted to store upstream frames inputted from the upstream lookup and learner until the upstream frames are outputted to the network port.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 3:
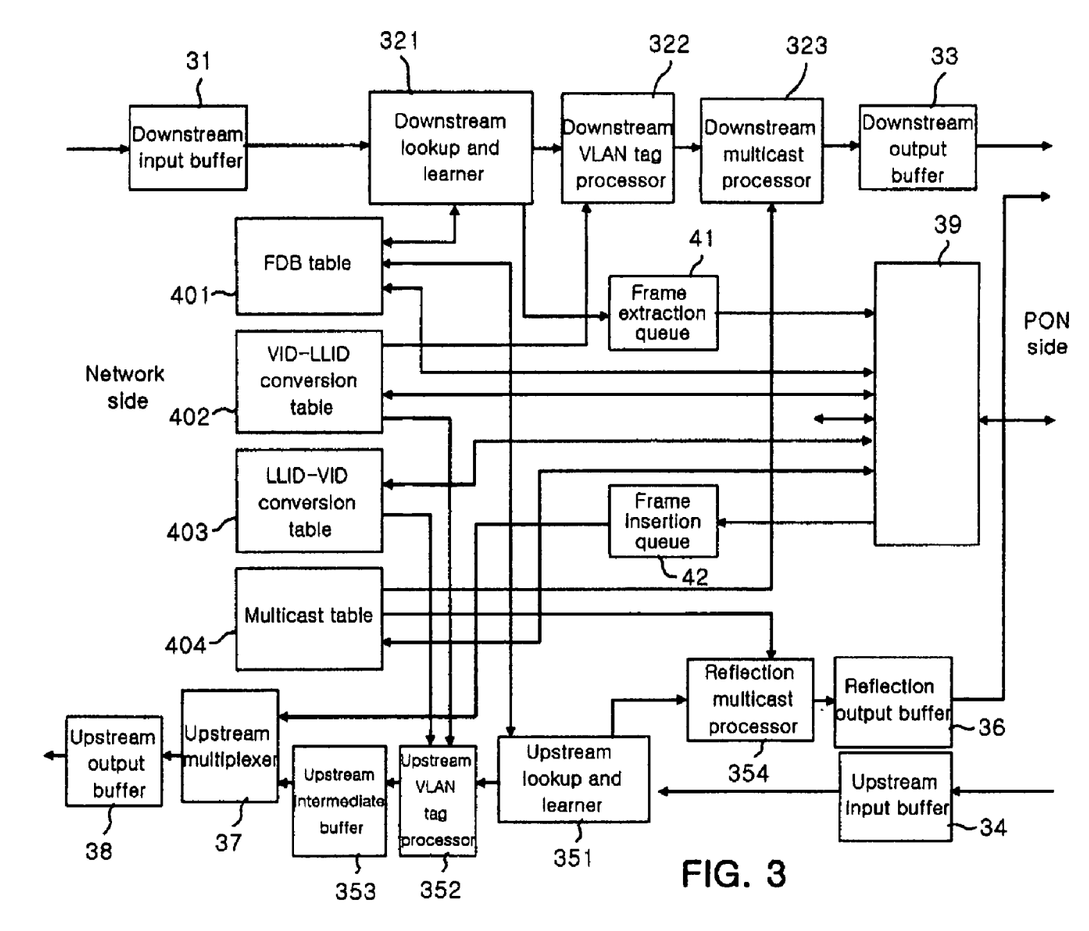
FIG. 3 is a block diagram of an EPON bridge apparatus according to an embodiment of the invention.

FIG. 3 is a block diagram of an Ethernet Passive Optical Network (EPON) bridge apparatus of the invention.

The EPON bridge apparatus of the invention is applied to an EPON master apparatus mounted on an OLT 11, more particularly a PON bridge 22 of the EPON master apparatus. In addition, regarding Internet Group Management Protocol (IGMP) snooping pertinent to the invention, IGMP report frame transferred from the ONU 12a-12c is extracted by the MAC controller 23.

Referring to FIG. 3, the EPON bridge apparatus according to the invention includes an FDB table 401 adapted to keep a MAC address and associated port information for the learned MAC addresses, and if the port is the PON side, the LLID value corresponding to the MAC address as added port information; a downstream input buffer 31 adapted to store downstream frames inputted from the network port until the network port and the PON port are bridged; a downstream lookup and learner 321 adapted to read a downstream frame stored in the downstream input buffer 31, learn the port information for the source MAC address of the downstream frame and record the learned information in the FDB table 401, attach a destination LLID to the downstream frame by referring to the FDB table 401; a downstream output buffer 33 adapted to store the downstream frames inputted from the downstream lookup and learner 321 until the downstream frames are transmitted to the PON port; an upstream input buffer 34 adapted to store upstream frames inputted from the PON port until the network port and the PON port are bridged; an upstream lookup and learner 351 adapted to read upstream frame stored in the upstream input buffer 34, record the learned information in the FDB table 401 by associating a source MAC address of the upstream frame to the source LLID of the upstream frame from the PON port, refer to the FDB table 401 to get the port information on the destination MAC address of the upstream frame, and if the port is in the network side, output the upstream frame to the upstream output buffer after removing the source LLID of the upstream frame; and an upstream output buffer 34 adapted to store upstream frames outputted from the upstream lookup and learner 351 until the upstream frames are outputted to the network port.

Moreover, for direct bridging between the ONUs 12a-12c identified by the LLIDs, the EPON bridge apparatus of the invention further includes a reflection output buffer 36 adapted to store reflected upstream frames outputted from the upstream lookup and learner 351 and then output them to the PON port sequentially. In this case if the destination MAC address of the upstream frame is present in the PON port, the upstream lookup and learner 351 attaches an LLID of the destination MAC address obtained by referring to the FDB table to the upstream frame and outputs the frame to the reflection output buffer 36.

The EPON bridge apparatus of the invention further includes a VID-LLID conversion table 402 adapted to store an LLID value to be attached to the downstream frame according to an input VLAN Identifier (VID) value thereof; an LLID-VID conversion table 403 adapted to store VLAN tag value to add to the upstream frame according to an input LLID thereof; a multicast table 404 adapted to store registered multicast address for downstream frame with LLID corresponding thereto; a downstream VLAN tag processor 322 adapted to use VID value received in the downstream frame inputted from the downstream lookup and learner 321, search the VID-LLID conversion table to correct the LLID of the downstream frame with the LLID corresponding to the VID and remove the VLAN tag; an upstream VLAN tag 352 processor adapted to search VLAN tag information corresponding to the upstream frame inputted from the upstream lookup and learner in the LLID-VID conversion table, and add a VLAN tag with VID corresponding to the input LLID of the upstream frame and pass it to the output; a downstream multicast processor 323 adapted to check whether or not the downstream frame transferred from the lookup and learner 321 or the downstream VLAN tag processor 322 has multicast address as destination MAC address, and in case of multicast address, search LLID information pertaining to the multicast destination MAC address in the multicast table 404, and then replace LLID of the downstream frame with the searched LLID to forward to the downstream output buffer 33; and a reflection multicast processor 354 adapted to, if a destination MAC address of the frame outputted from the upstream lookup and learner 351 of the upstream frame is a multicast address, check whether or not the multicast address is registered in the multicast table 404, and if registered, convert the LLID value of the upstream frame into the searched LLID value in the multicast table 404 to output the frame to the reflection output buffer 36.

Also, the EPON bridge apparatus of the invention still further includes a frame extraction queue 41 adapted to store a frame to be processed by the CPU 25 out of downstream frames, inform the CPU 25 of every frame stored through interrupt, provide the number and lengths of the stored frames to the CPU enabling the CPU to read the frames; a processor interface 39 adapted to interface to ensure the external CPU 25 to insert or extract frame into/from the frame extraction queue 41 or the frame insertion queue 42; an upstream intermediate buffer 353 adapted to store frames outputted from the upstream lookup and learner 351 or upstream VLAN tag processor 352 until the frames are transmitted to the network port, and output a read request along with information on frame lengths if there is at least one frame inside; and an upstream multiplexer 37 adapted to selectively read frame from the frame insertion queue 42 or upstream intermediate buffer 353 at the request of the frame insertion queue 42 or upstream intermediate buffer 353 to transfer to the upstream output buffer 38.

In the following explanations, a downstream frame means a frame inputted from the network port or outputted to the PON port, while an upstream frame means a frame inputted from the PON port or outputted to the network port.

The downstream input buffer 31 is a means for storing a frame inputted from the upper network. If at least one frame is stored, according to a first in first out (FIFO) method, length information of the frame waiting in front (the frame stored first) and a frame read request are provided to the downstream lookup and learner 321.

The downstream lookup and learner 321, at the request of the downstream input buffer 31, compares the length of the frame waiting in the front of the downstream input buffer 31 with the usable space of the downstream output buffer 33. If the frame length is smaller than the usable space of the downstream output buffer 33, the downstream lookup and learner 321 reads the frame from the downstream input buffer 31 and executes bridging according to the invention. More specifically, the downstream lookup and learner 321 checks a destination MAC address of the downstream frame, a search destination LLID corresponding to the destination MAC address in the FDB table 401, attach the searched LLID to the read frame to output. In this case, if the destination MAC address of the downstream frame is deemed to be present in the network port, the frame is discarded. In addition, the downstream lookup and learner 321 learns a source MAC address of the downstream frame and records port information on a MAC address in the FDB table 401. Also, the downstream lookup and learner 321 extracts a frame to be processed by the CPU 25 from the inputted downstream frames, and transfers the same to the frame extraction queue 41.

A VLAN tag remover 322 uses a VID value of a VLAN tag included in the downstream frame processed by the downstream lookup and learner 321, retrieves an LLID value corresponding to the VID from the VID-LLID conversion table 402, and replaces the LLID value attached by the downstream lookup and learner 321 with the new LLID for the VID. The VLAN tag remover 322 removes the VLAN tag after this LLID replacement. If the VID value is registered as the VLAN tag to be inserted and removed in the ONU of the VID-LLID conversion table 402, the VLAN tag remover 322 transfers the downstream frame to the next processing block without removing the VLAN tag.

In contrast, if information on the VID is not searched in the VID-LLID conversion table 402, the VLAN tag remover 322 outputs the downstream frame outputted from the downstream lookup and learner 321 as is. The frame is forwarded to a downstream multicast remover 323.

The downstream multicast remover 323 examines whether or not the downstream frame outputted from the downstream VLAN tag remover 322 has a multicast address as a destination MAC address, searches for information pertaining to the multicast address in the multicast table 404 in case of a multicast address, replaces the LLID value of the downstream frame with the LLID value associated with the multicast address, and then outputs the downstream frame to the downstream output buffer 33. In contrast, if destination MAC address of a multicast frame is not registered on the multicast table 404, the frame is discarded or transferred to the downstream output buffer 33 without replacing the LLID according to the mode settings.

If downstream frame is a multicast frame, since the destination MAC address of the frame has not been learned by the FDB table 401, a broadcast LLID will be attached to the downstream frame in the downstream lookup and learner 321. If in the case of a VLAN mode, the downstream frame belongs to a VLAN, it will have an LLID corresponding to a VLAN overwritten thereto, and if the downstream frame belongs to a multicast group within the VLAN, it will have an LLID corresponding to multicast overwritten thereto.

The downstream output buffer 33 stores downstream frames processed as described above until the frames are transmitted to the PON port. The downstream output buffer 33 runs according to the FIFO method. If there is at least one frame, the downstream output buffer 33 sends length information of the frame waiting in front (the frame inputted first) and a transmission request signal to a MAC controller 23. Consequently, if a read signal comes from the MAC controller 23, the downstream output buffer 33 transfers a frame to the MAC controller 23 to allow downstream transmission.

The upstream input buffer 34 stores upstream frames (data received from the PON side) transferred from the MAC controller 23 until the network port and the PON port are bridged. If there is at least one frame, the upstream input buffer 34 sends length information of the frame waiting in front (the frame inputted first) and a process request to the upstream lookup and learner 351. Consequently, if a read signal comes from the upstream lookup and learner 351, the upstream input buffer 34 transfers the frame to the upstream lookup and learner 351.

The upstream lookup and learner 351 reads an upstream frame from the upstream input buffer 34, looks up port information on a destination MAC address in the FDB table 401, and if as a result of the lookup, the destination of the upstream frame is present in the PON port, the upstream lookup and learner 351 attaches an LLID corresponding to a destination MAC address to the frame to forward it to the reflection multicast processor 354. In contrast, if the destination of the upstream frame is present in the network port, the upstream lookup and learner 351 removes the LLID from the inputted upstream frame and then outputs the same to the upstream output buffer 38 or transfers the same to the VLAN tag inserter 352 with the source LLID attached.

If the destination MAC address is not registered in the FDB table 401, the upstream lookup and learner 351 attaches an anti-LLID corresponding to the source LLID to the inputted upstream frame, and transfers the upstream frame to the reflection multicast processor 312, and at the same time transfers the same to the VLAN tag inserter 352 without removing the source LLID. Also, if the destination MAC address is present in the PON port and the LLID corresponding to the destination MAC address is identical to the source LLID, the upstream frame is discarded. The upstream lookup and learner 351 learns port information on the source MAC address and the LLID value of all inputted upstream frames to record the information in the FDB table 401.

A VLAN tag inserter 352 reads the LLID-VID conversion table 403 to get the VID value corresponding to the source LLID of the upstream frame outputted from the upstream lookup and learner 351 and adds a VLAN tag having a corresponding VID, removes an existing LLID, and transfers the upstream frame to the upstream intermediate buffer 353. If the VID value is registered as the VLAN tag to be inserted and removed in the ONU in the VID-LLID conversion table 402, the VLAN tag inserter 352 transfers the upstream frame to the upstream intermediate buffer 353 without changing the existing VLAN tag.

The upstream intermediate buffer 353 stores upstream frames outputted from the VLAN tag inserter 352 until the upstream frames are selected by an upstream multiplexer 37 and transmitted to the network port. The upstream intermediate buffer 353 runs according to the FIFO method. If there is at least one frame stored, the upstream intermediate buffer 353 transfers length information on the frame waiting in front (the frame inputted first) and a process request to the upstream multiplexer 37. Consequently, if a read signal comes from the upstream multiplexer 37, the upstream intermediate buffer 353 transfers the frame to the upstream multiplexer 37.

The upstream multiplexer 37 selects one of the frame insertion queue 42 and the upstream intermediate buffer 353, reads a frame and transfers the same to the upstream output buffer 38. More particularly, if a frame transmission request is sent from the frame insertion queue 42 or upstream intermediate buffer 353, the upstream multiplexer 37 selects the frame insertion queue 42 or upstream intermediate buffer 353, according to a pre-set order or priorities, reads a frame stored therein respectively, and transfers the same to the upstream output buffer 38.

The upstream output buffer 38 stores frames to be transmitted to the upstream network port until the frames are outputted to the network port. A frame is outputted in line with the speed of the output port and if necessary, a frame check sequence (FCS) is added. In this case, information as to whether to calculate an FCS newly is transferred along with frame. If VLAN tag is newly added to the upstream frame or when the frame is sent from the CPU 25, an FCS should be newly calculated.

A reflection multicast remover 354, if a frame reflected down from the upstream lookup and learner 351 has a multicast address as a destination MAC address, searches for information pertaining to the multicast address in the multicast table 404, replaces an LLID value of the frame with an LLID value retrieved from the multicast table 404 to transfer the frame to the reflection output buffer 36 if the multicast address is registered. In contrast, if the multicast address is not registered, the frame is discarded or outputted to the reflection output buffer 36 without replacing the LLID according to the mode settings.

The reflection output buffer 36 stores a frame transferred from the reflection multicast remover 354 until the frame is transferred to the PON port. The reflection output buffer 36 runs according to the FIFO method. If there is at least one frame stored, the reflection output buffer 36 transfers length information of the frame waiting in front (the frame inputted first) and a transmission request signal to the MAC controller 23. If a read signal comes in return, the frame is transferred to the MAC controller 23.

An FDB table 401 is updated via learning of the downstream/upstream lookup and learner 321,351 or set by the CPU 25. The FDB table 401 has port information on where MAC addresses are located; whether a MAC address is present in the network port or in the PON port. Also the FDB table 401 has information on an LLID value in a case where the MAC address is present in the PON port side.

Figure 5:
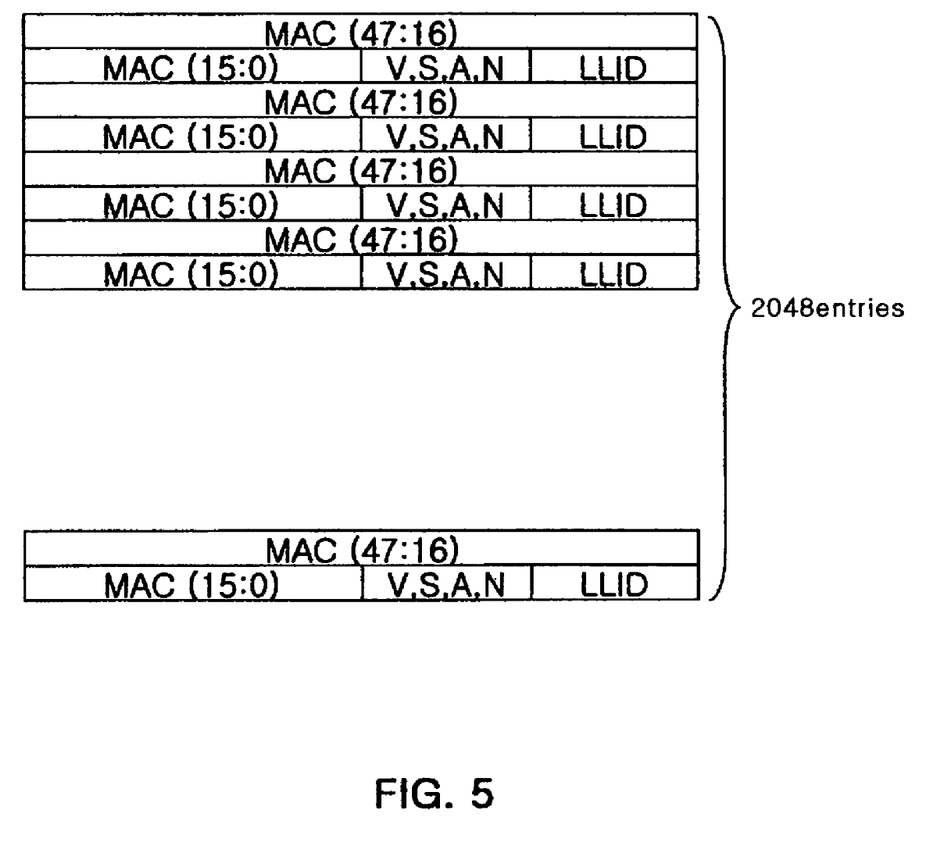
FIG. 5 shows an example of an FDB table of the invention.

FIG. 5 shows an example of the FDB table 401, in which each entry includes a V bit indicating whether or not the entry is valid; an S bit indicating whether or not the entry is an entry resulted from learning or a static entry set by the CPU 25; and an A bit indicating that the entry is old. The FDB table 401 further includes an N bit indicating that corresponding address is present in the network port, in which case the LLID value is 0.

The A bit is regularly set as 1 by the CPU 25 with a predefined cycle time, and reset as 0 when the MAC address of the entry is observed as the source address of the input downstream or upstream frame. Thereby, when the CPU 25 reads the entry in the next cycle to find that the A bit remains 1, this indicates that the entry is old without any input observed during the last cycle and the old entry can be deleted. Since the FDB table 401 manages a MAC address, it is also called the MAC table.

In addition, in the FDB table 401 shown in FIG. 5, a MAC address is 48 bits long and can have $2^{48}$ number of address values. To execute learning or lookup with limited memory, a plurality of MAC addresses should be allowed to share a small storage space. That is, to have 2K entries, 48 bits of MAC address should be used to obtain 11 bits of entry address. As has been known, this is easily obtainable by dividing the MAC addresses by a cyclic redundancy check-32 (CRC32) formula and then taking 11 lower bits from the result.

Further, to utilize table resources more efficiently, the present invention can use an entry address obtained as described above and an associated address located in a predetermined offset position from the entry. This is possible by looking at associated address simultaneously in executing lookup or learning. That is, during the learning process, address obtained by hash and other addresses associated therewith are looked at simultaneously. If information on MAC is not recorded therein, the information is recorded in an empty space of either address. Also, during the lookup process, an address obtained by hash and other address associated therewith are looked at simultaneously. If information on MAC is recorded therein, either address can be selected to be used. This process can significantly reduce probability that hash values happen to be identical for two different MAC addresses thus preventing learning or lookup due to shortage of space in the FDB table 401.

The VID-LLID conversion table 402 is set by the CPU 25 and read by the VLAN tag remover 322. The VID-LLID conversion table 402 has an LLID value to be attached to a frame according to inputted VID values and information as to whether to remove the VLAN tag or not for each VID value when passing the frame downstream. The VID-LLID conversion table 402 has 4K entries to handle all the VID values.

Figure 6:
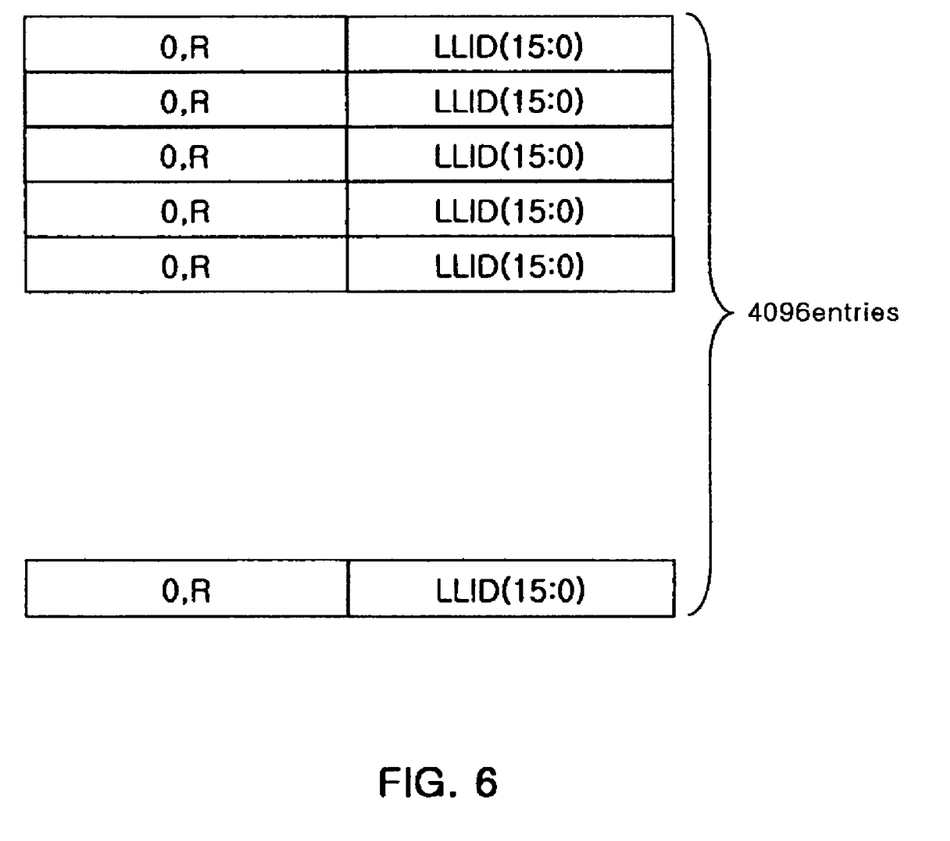
FIG. 6 shows an example of a VID-LLID conversion table of the invention.

FIG. 6 shows an example of the VID-LLID conversion table 402 as described above. As shown in FIG. 6, all VID values have entries and thus a VID value can be converted into an entry address. Out of the information on the VID-LLID conversion table 402, an R bit indicates that since the VID is registered to have the VLAN tag be removed at the ONU in the downstream, the VLAN tag should not be removed at the VLAN tag remover. Also, the R bit indicates that the upstream frames inputted from the PON port should be transferred to the network port without removing the VLAN tag.

The LLID-VID conversion table 403 is set by the CPU 25 and read by the VLAN tag inserter 352. If the upstream frame is inputted from the PON port, the LLID-VID conversion table 403, which records VLAN tag value to be added for the input LLID, is referred by the VLAN tag inserter 352.

Figure 7:
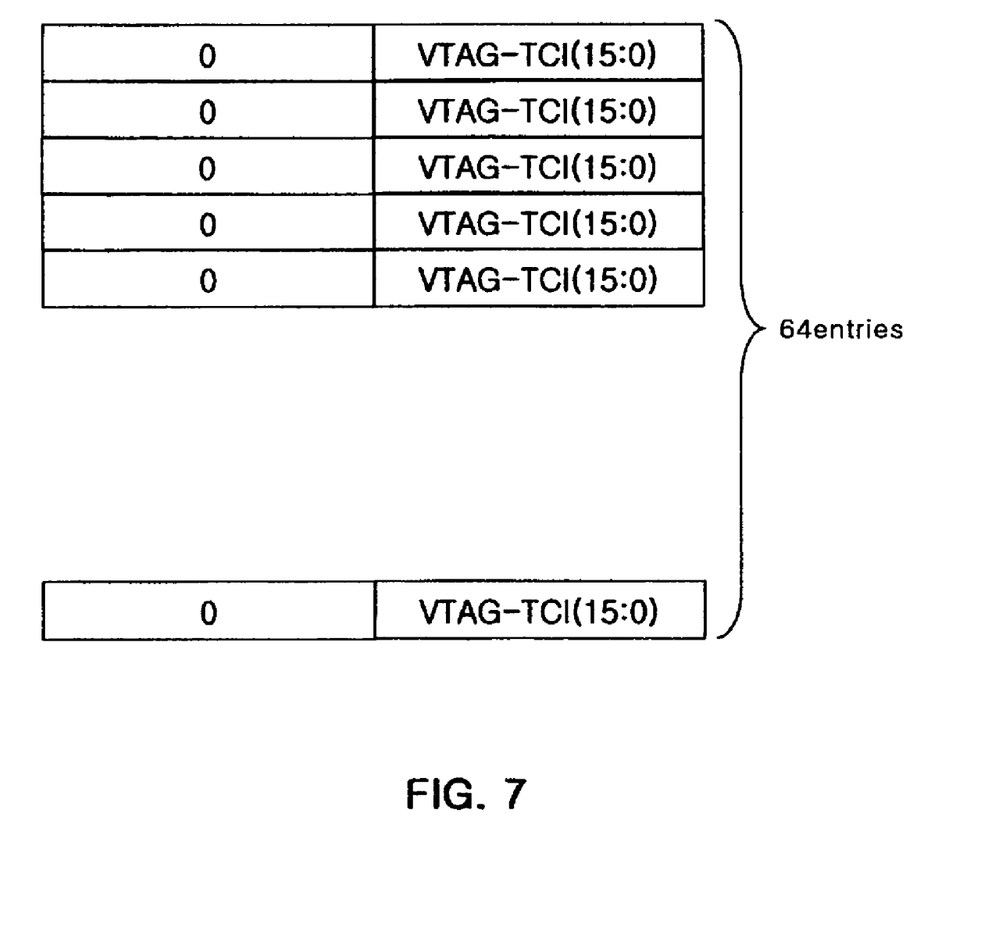
FIG. 7 shows an example of a LLID-VID conversion table of the invention.

FIG. 7 shows an example of the LLID-VID conversion table 403 supporting 64 LLIDs. As stated above, the LLID-VID conversion table 403 has entries for all LLID values and thus LLID value can be used as address of table entry.

Figure 8:
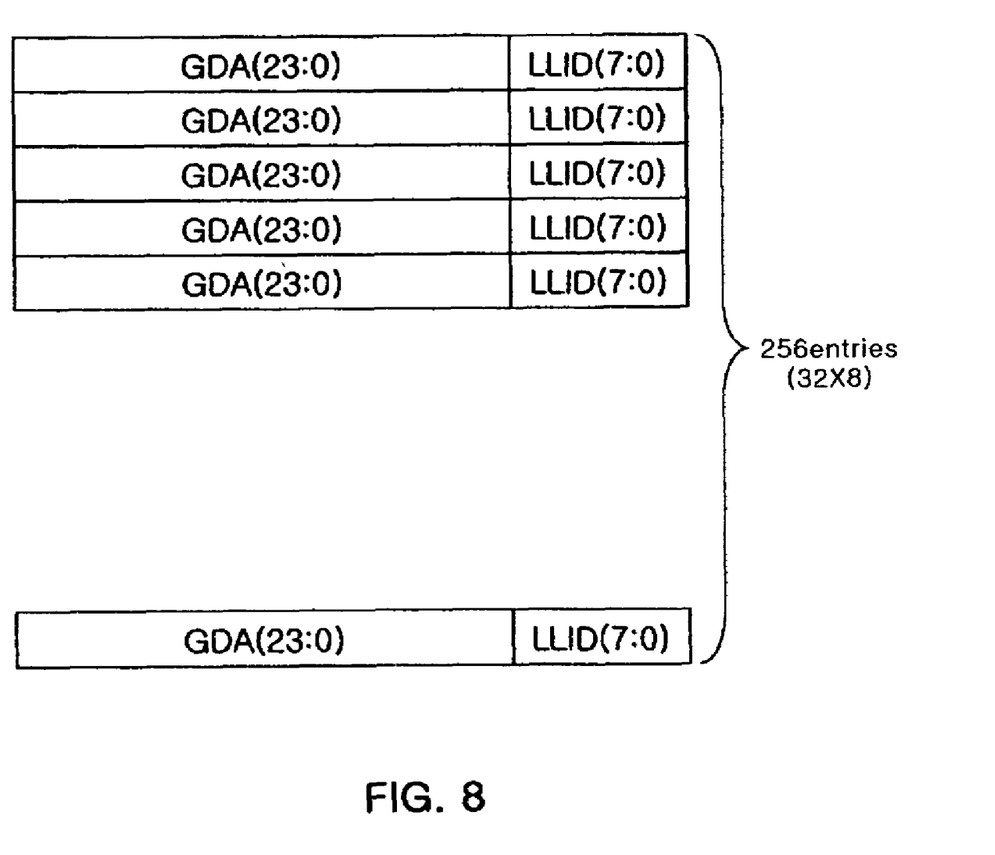
FIG. 8 shows an example of a multicast table of the invention.

The multicast table 404 stores a multicast address registered for the PON side. In this case, 23 lower bits of the multicast MAC address, equivalent to 23 lower bits of an IP multicast address, are stored with the associated LLID value.

Generally, a multicast address in IP has values ranging from 224.0.0.0 to 239.255.255.255 and is called a Group Destination Addresses (GDA). This address does not indicate the address of a terminal but the group, and a desired terminal selects and receives a packet of a destination address. When this IP packet is converted into an Ethernet frame, by the standard, a MAC address corresponding to each GDA is determined. The MAC address is formed by attaching the lower 23 bits of the GDA to 01-00-5e. Therefore, the bridge recognizes whether or not a frame is a multicast frame by looking at the destination MAC address, and identifies multicast group via lower 23 bits.

FIG. 8 shows an example of a multicast table 404 of the invention. The multicast table 404 stores 256 entries, indicating whether or not the entries are registered in regard to 24 bits of the GDA. In this example, a multicast address having 0 as LLID is considered as not registered. Since a GDA can have $2^{24}$ values but the number of entries is limited to 256, $2^{24}$ values should be mapped into 256 via a hashing operation. Also, 256 entries are divided into 32 groups, one of the 32 groups should be selected via a hashing operation, and then the group can share 8 entries in parallel.

Look up of the FDB table 401, VID-LLID conversion table 402 or LLID-VID conversion table 403, and multicast table 404 is executed sequentially as described above but not limited thereto. Lookup of all tables 401-404 can be executed simultaneously if the processings are done in one place and the result of the table reading is combined and applied in one place. This reduces processing latencies the upstream/downstream frame suffers in the bridge apparatus.

Figure 4:
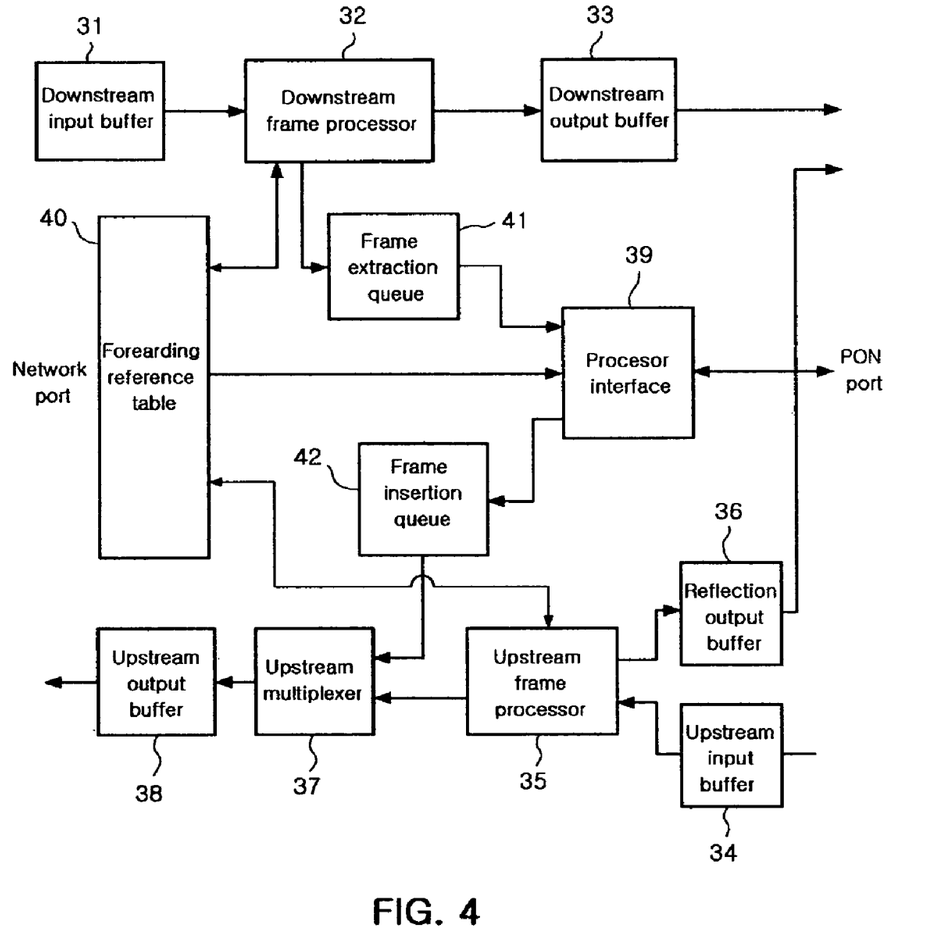
FIG. 4 is a block diagram of the EPON bridge apparatus according to another embodiment of the invention.

FIG. 4 is a block diagram of the EPON bridge apparatus of the invention. As shown in FIG. 4, the downstream frame processor 32 includes the downstream lookup and learner 321, downstream VLAN tag processor 322, and downstream multicast processor 323 of FIG. 3, all of which execute lookup and bridging process simultaneously. Likewise, the upstream processor 35 includes the upstream lookup and learner 351, upstream VLAN tag processor 352, upstream intermediate buffer 353 and reflection multicast processor 354, all of which execute lookup and bridging process simultaneously. A forwarding reference table 40 shows a grouping of the FDB table 401, VID-LLID conversion table 402, LLID-VID conversion table 403, and the multicast table 404 of FIG. 3. Construction elements with the same reference numerals as FIG. 3 perform the same operations as FIG. 3.

The EPON bridge apparatus of the invention basically inserts an LLID into a frame inputted from the network port to transmit the frame the PON port, whereas the apparatus replaces the frame inputted from the PON port with a new destination LLID to transmit to the PON port when the destination is in PON side, or transmit to the network port with the LLID removed when the destination is in network side. In either case, learning is executed for a source MAC address of an input frame and input port.

More specifically, the EPON bridge apparatus runs in two types of operation mode.

The first operation mode is LAN mode adapted to make the PON appear as a Local Area Network (LAN) seen by other attached devices. In this operation mode, if a downstream frame is inputted from the network port, destination information thereof is searched in the FDB table 401, and if the destination is present in the PON port, a destination LLID is attached thereto to be forwarded to the PON port. Meanwhile if the destination is present in the network port, the frame is discarded. If the destination of the downstream frame is not identifiable, a broadcast LLID is attached thereto to be transferred to the PON port. In contrast, if the upstream frame is inputted from the PON port, destination information is looked up in the FDB table, and if the destination of the upstream frame is an LLID different from the source LLID, a new LLID (destination LLID) is attached thereto to be forwarded to the PON port. Meanwhile if the destination of the upstream frame is present in the network port, the LLID attached thereto is removed and the frame is transferred to the network port. If the destination of the upstream frame is in the PON and the LLID thereof is identical to the source LLID, the frame is discarded. Also if the destination of the upstream frame is not identifiable, the frame is forwarded to the network port after the LLID thereof is removed, and at the same time, is forwarded to the PON port with an anti-LLID corresponding to the inputted LLID attached.

The second operation mode is VLAN mode adapted to make PON treated as a plurality of VLANs identified by a VLAN ID (VID) seen by an upper network.

In this operation mode, when a frame is inputted with a VLAN tag, the EPON bridge apparatus refers to the VID-LLID conversion table 402. If the frame has a registered VID, normally, the VLAN tag is removed therefrom and the frame is forwarded to the PON port with a destination LLID corresponding to the VID attached. In contrast, if the frame has an unregistered VID, the frame is discarded or forwarded to the PON port with broadcast LLID attached according to the mode settings. Also, for arbitrary VID values registered to have a VLAN tag inserted or removed in the ONU, the frame is forwarded without removing VLAN tag. In contrast, if the upstream frame is inputted from the PON port, the apparatus refers to the LLID-VID conversion table 403, removes the LLID from the frame, attaches a VLAN tag, and sends the frame to the network port. In this case, the frame is forwarded basically with a VLAN tag attached, but for arbitrary VID values registered to have a VLAN tag inserted and removed in the ONU, the frame is forwarded without removing the original VLAN tag. Also, among the frames having a VLAN tag attached already, any frame with an unregistered VID value may be discarded.

Moreover, in the VLAN mode, a frame can be connected to the network port via VLAN tags containing a VID that are used only in the provider network and not seen in the subscriber network through a specified setting. Then in this setting, the downstream frame has a VLAN tag always removed before getting forwarded with an LLID corresponding to the VID attached, and the upstream frame is forwarded after always attaching a VID corresponding to the source LLID. This unconditional tag removal or insertion occurs regardless of the existence of a VLAN tag in the frame thus preserving possible clients' VLAN tag.

Figure 9:
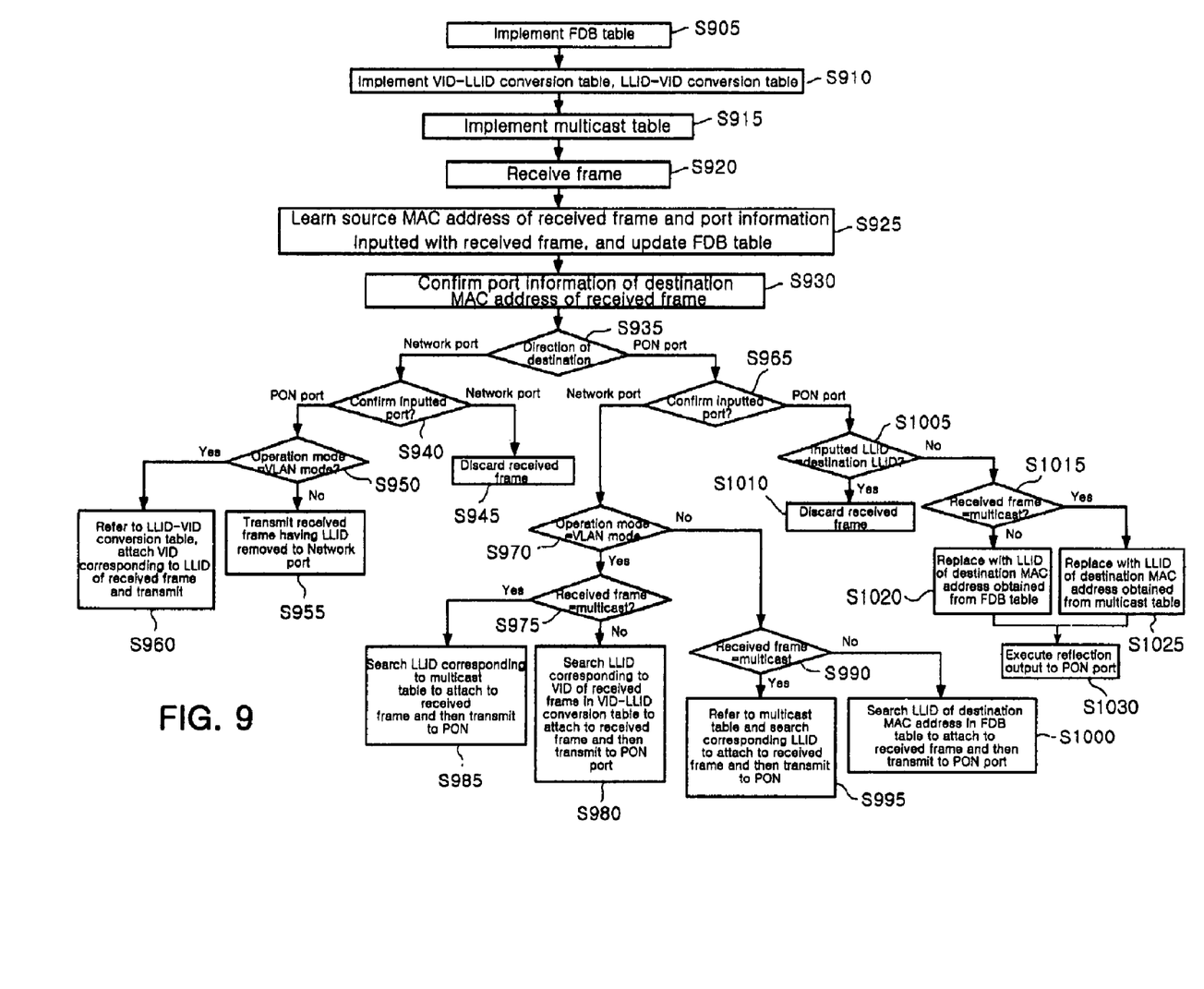
FIG. 9 is a detailed flowchart showing preferred embodiment of a forwarding method of the EPON bridge apparatus of the invention.

FIG. 9 is a flowchart illustrating a forwarding method of the EPON bridge apparatus of the invention.

In reference to FIG. 9, the EPON bridge apparatus executing bridging between the network port and the PON port constructs the FDB table 401, the VID-LLID conversion table 402, the LLID-VID conversion table 403, and the multicast table 404 S905-S915. In this case, the VID-LLID conversion table 402, the LLID-VID conversion table 403, and the multicast table 404 are implemented by the CPU 25. The FDB table 401 may be automatically corrected by learning and some entries may be implemented by the CPU 25.

The EPON bridge apparatus as implemented above receives a frame from the network port or the PON port in S920.

The received frame associates an inputted port with a source MAC address of the frame to record it in the FDB table 401. Moreover, if an upstream frame is received, a source LLID of the frame is additionally recorded.

Then the FDB table 401 is searched for the destination MAC address of the received frame to see to which port the destination is located in S935.

As a result of the lookup, if the frame is inputted from the PON port when a destination MAC address is present in the network port, in the case of VLAN mode, the EPON bridge apparatus refers to the LLID-VID conversion table 403 to remove the LLID from the received frame, and forwards the received frame to the network port by adding a VLAN tag including the corresponding VID thereto in S935-S960. In contrast, in case of the non-VLAN mode, the frame is transmitted either to the network port with the LLID removed or to the PON port with the LLID replaced with an anti-LLID.

Alternately, as a result of the confirmation, if the frame is inputted from the network port when a destination MAC address is present in lower PON port, in the case of the VLAN mode, the EPON bridge apparatus refers to the VID-LLID conversion table 402 to remove the VID of the received frame and replace the LLID with that corresponding to the VID in S965-S1000. Then in the case of multicast frame, if the destination address is registered in the multicast table, the LLID thereof is replaced by an LLID obtained from the multicast table and the frame is transmitted to the PON port. In the case of the non-VLAN mode, a destination LLID is searched in the FDB table 401 or the multicast table 404 to be attached to the received frame. Moreover in the case of multicast frame, if the destination address is registered in the multicast table, the LLID of the frame is replaced by an LLID obtained from the multicast table and the frame is transmitted to the PON port. Then, in S1005-S1030, if the frame is inputted from the PON port, the EPON apparatus refers to the FDB table 401 to replace the LLID of the received frame with the destination LLID. In addition, in the case of a multicast frame, if the destination address is registered in the multicast table, the LLID of the frame is replaced by an LLID obtained from the multicast table. The frame is subject to reflection output to the PON or if the inputted LLID is identical to the destination LLID, the received frame is discarded.

The present invention provides a variety of linking methods to the EPON. Especially, a bridging function between the upper network port and a plurality of logical ports in the EPON can be executed via the FDB table. Also, by blocking direct bridging among the ONUs and mapping an LLID into the VID, the EPON may be treated as a plurality of VLANs. In addition, in case where the EPON is made as if it is a plurality of VLANs, VLAN can be set by ONU, or with respect to each port or service of the ONU by allowing VLAN tagging/detagging at the ONUs for specific VIDs.

Also, according to the present invention, a VLAN tag can be inserted into the upstream frame regardless of the existing tag, whereas a VLAN tag used for the network can be removed from the downstream frame. Thereby, a subscriber VLAN can be linked via network VLAN apart from use of the VLAN in the EPON.

Further, according to the present invention, if there is any ONU that requests multicast traffic, traffic can be transmitted to only ONUs or ONU groups that request it, while preventing multicast traffic from being transferred to other ONUs, ensuring efficient use of network.

While the present invention has been shown and described in connection with the preferred embodiments, it will be apparent to those skilled in the art that modifications and variations can be made without departing from the spirit and scope of the invention as defined by the appended claims.

What is claimed is:

1. A forwarding method of an Ethernet Passive Optical Network (EPON) bridge apparatus, which executes bridging between a network port and a PON port including a plurality of logical ports via a Logical Link Identifier (LLID) assigned to an Optical Network Unit (ONU) in the PON, the method comprising steps of:

receiving a frame from the network port or the PON port;
associating a port among the network port and the PON port through which the frame was received with a source MAC address of the received frame and recording that information to a forwarding database (FDB) table configured to keep the port information for MAC addresses;
searching the FDB table for a destination MAC address of the received frame to get the port information of the destination MAC address;
(i) forwarding the received frame to the network port after removing an LLID therefrom, when upon searching the FDB table a destination MAC address of an upstream frame received is present in the network port; and
(ii) forwarding the received frame to the PON port after adding an LLID corresponding to the destination MAC address to the received frame, when upon searching the FDB table a destination MAC address is present in the lower PON port.

2. The forwarding method according to claim 1, further comprising steps of:

providing a VID-LLID table for each VLAN Identifier (VID) value of the received frames so that an input put VID value can be used as an entry address of the VID-LLID table, each entry of the VID-LLID table containing an LLID value to attach for a corresponding VID in the downstream process and information on whether a VLAN tag addition for the upstream frame and a VLAN tag removal for a downstream frame is to be done in an ONU side of the EPON bridge apparatus and not in an OLT side of the EPON bridge apparatus;
providing an LLID-VID table for each LLID value of the upstream frame so that the LLID value can be used as the entry address of the LLID-VID table, each entry of the LLID-VID table containing VLAN tag information to add for a corresponding LLID.

3. The forwarding method according to claim 1, further comprising recording an LLID value to be replaced with for each registered multicast group MAC address, for a plurality of arbitrary multicast addresses in a multicast table.

4. The forwarding method according to claim 3, wherein each entry of the multicast table includes 23 lower bits of a registered multicast MAC address and the LLID value corresponding to the registered multicast address.

5. The forwarding method according to claim 1, wherein an entry address of the FDB table is obtained by hash calculation on a MAC address of the received frame, the entry including a MAC address, port information for the MAC address, and a corresponding LLID information when a MAC address is present in the PON port.

6. The forwarding method according to claim 1, wherein the forwarding step (ii) comprises:

when the received frame is an upstream frame inputted from the PON port, replacing an LLID of the received frame with an LLID corresponding to the destination MAC address to transfer the received frame to the PON port.

7. The forwarding method according to claim 6, wherein the forwarding step (ii) comprises:

the LLID of the received frame is identical to the LLID corresponding to the destination MAC address, discarding the received frame.

8. The forwarding method according to claim 1, further comprising:

when an LLID corresponding to destination MAC address of the received frame is unknown, if the received frame is a downstream data inputted from the network port, adding a broadcast LLID to the received frame to transmit the received frame to the PON port, and
if the received frame is an upstream data inputted from the PON port, removing the LLID from the received frame to transfer the received frame to the network port, and at the same time replacing the LLID of the received frame with an anti-LLID of the LLID of the received frame to forward the received frame to the PON port.

9. The forwarding method according to claim 2, wherein the forwarding step (i) further comprises:

when the received frame is an upstream frame inputted from the PON port, referring to the LLID-VID conversion table and attaching a VLAN tag corresponding to the input LLID attached to the received frame to forward the received frame to the network port.

10. The forwarding method according to claim 2, wherein the forwarding step (ii) further comprises:
  searching the VID-LLID conversion table with the VID included in VLAN tag and attaching an LLID corresponding to the VID to the received frame to forward the received frame to the PON port, when the received frame is inputted from the network port and includes a VLAN tag.

11. The forwarding method according to claim 9 or 10, wherein with respect to the VID-LLID conversion table, a VLAN tag in the received frame is maintained for the VID registered to have VLAN tag insertion or removal in the ONU side.

12. The forwarding method according to claim 9, wherein when attaching a VLAN tag, an LLID included in the received frame is removed.

13. The forwarding method according to claim 10, wherein when attaching an LLID, a VLAN tag included in the received frame is removed.

14. The forwarding method according to claim 3, wherein the forwarding step (ii) comprises:
  when the received frame is a multicast frame inputted from the network port, referring to the multicast table and replacing the LLID of the received frame with an LLID corresponding to the multicast address to forward the received frame to the PON port.

15. An Ethernet Passive Optical Network (EPON) bridge apparatus for executing bridging between a network port and a PON port including a plurality of logical ports via a Logical Link Identifier (LLID) assigned to an Optical Network Unit (ONU) of the PON, comprising:
  an FDB table configured to keep MAC address and associated port information for the MAC addresses, and when the port is the PON side, the LLID value as the port information;
  a downstream input buffer configured to store downstream frames inputted from the network port until the network port and the PON port are bridged;
  a downstream lookup and learner configured to read the downstream frame stored in the downstream input buffer, learn the port information for a source MAC address of the downstream frame and record the learned information in the FDB table, attach a destination LLID corresponding to a destination MAC address of the downstream frame to the frame by referring to the FDB table;
  a downstream output buffer configured to store downstream frames inputted from the downstream lookup and learner until the downstream frames are transmitted to the PON port;
  an upstream input buffer configured to store upstream frames inputted from the PON port until the network port and the PON port bridged;
  an upstream lookup and learner configured to read upstream frames stored in the upstream input buffer, record the learned information in the FDB table by associating a source MAC address of the upstream frame to a source LLID of the upstream frame from the PON port, refer to the FDB table to get the port information on a destination MAC address of the upstream frame, and when the port is in the network side, output the upstream frame to the upstream output buffer after removing the source LLID of the upstream frame; and
  an upstream output buffer configured to store upstream frames outputted from the upstream lookup and learner until the upstream frames are outputted to the network port.

16. The EPON bridge apparatus according to claim 15, further comprising:
  a reflection output buffer configured to store an upstream frame outputted from the upstream lookup and learner and output the stored frame to the PON port when selected,
  wherein when the destination MAC address of the upstream frame is present in the PON port, the upstream lookup and learner is further configured to attach an LLID of the destination MAC address to the upstream frame to output the upstream frame to the reflection output buffer, wherein the LLID of the destination MAC address is obtained by referring to the FDB table.

17. The EPON bridge apparatus according to claim 16, wherein when the destination MAC address of the inputted upstream frame is present in the PON port, and the destination LLID and the source LLID on the upstream frame are identical, the upstream lookup and learner is configured to discard the upstream frame.

18. The EPON bridge apparatus according to claim 16, wherein when the destination MAC address of the inputted upstream frame is not registered in the FDB table, the upstream lookup and learner is configured to attach an anti-LLID corresponding to the source LLID of the upstream frame to the upstream frame to output the same to the reflection output buffer and at the same time forward the upstream frame to the upstream VLAN tag processor without removing the source LLID.

19. The EPON bridge apparatus according to claim 16, further comprising:
  a VID-LLID conversion table configured to keep the LLID value to be attached to a downstream frame according to VID value of the input frame; and
  an LLID-VID conversion table configured to keep the VLAN tag value to add to the upstream frame according to the input LLID value.

20. The EPON bridge apparatus according to claim 19, further comprising a downstream VLAN tag processor configured to use a VID value contained in the downstream frame inputted from the downstream lookup and learner, search the VID-LLID conversion table to correct an LLID of the downstream frame into an LLID corresponding to the VID and remove the VLAN tag.

21. The EPON bridge apparatus according to claim 19, further comprising an upstream VLAN tag processor configured to search VLAN tag information corresponding to the LLID value of the upstream frame inputted from the upstream lookup and learner in the LLID-VID conversion table, and add the VLAN tag having the VID corresponding to the LLID of the upstream frame to output the upstream frame to the upstream output buffer,
  wherein in a VLAN operation mode, the upstream lookup and learner is configured to output the upstream frame with an LLID still attached to an upstream VLAN tag inserter.

22. The EPON bridge apparatus according to claim 21, wherein the VID-LLID conversion table further comprises information indicating whether or not the VLAN tag addition in the upstream and VLAN tag removal in the downstream is to be done in the ONU side.

23. The EPON bridge apparatus according to claim 22, wherein a downstream VLAN tag processor and the upstream VLAN tag processor are configured to, when the VID associated with the upstream frame or the downstream frame is set up to maintain VLAN tag, forward the downstream frame without removing a VLAN tag and forward the upstream frame without adding a VLAN tag.

24. The EPON bridge apparatus according to claim 15, further comprising a multicast table configured to manage a multicast address having a group membership in the PON port for a downstream frame and an LLID corresponding thereto.

25. The EPON bridge apparatus according to claim 24, further comprising a downstream multicast processor configured to check whether or not the downstream frame transferred from the lookup and learner or the downstream VLAN tag processor has a multicast address as the destination MAC address, and when the downstream frame has the multicast address, search LLID information pertaining to the MAC address in the multicast table, and then replace an LLID of the downstream frame with the searched LLID to forward the downstream frame to downstream output buffer.

26. The EPON bridge apparatus according to claim 24, further comprising a reflection multicast processor configured to, check whether or not a multicast address is registered in the multicast table when a destination MAC address of a frame outputted to the PON side provided with a new destination LLID by the upstream lookup and learner of the upstream frame is a multicast address, and when the multicast address is registered, convert an LLID value of the frame into a searched LLID value in the multicast table to output the frame to the reflection output buffer.

27. The EPON bridge apparatus according to claim 26, further comprising a frame extraction queue configured to store a frame to be processed by a CPU, inform the CPU of every frame stored through an interrupt, provide the number and lengths of the stored frames to the CPU enabling the CPU to read the frames;
  a frame insertion queue configured to store a frame outputted from the CPU, and if a frame is stored inside, issue a read request; and
  a processor interface configured to interface to ensure the external CPU to insert a frame into the frame extraction queue or the frame insertion queue and extract a frame from the frame extraction queue or the frame insertion queue,
  wherein the downstream lookup and learner is configured to extract a frame destined to the CPU among the downstream frames read from the downstream input buffer to forward the frame to the frame extraction queue.

28. The EPON bridge apparatus according to claim 27, further comprising:
  an upstream intermediate buffer configured to store frames outputted from the upstream lookup and learner or upstream VLAN tag processor until the frames are transmitted to the network port, and output a read request along with information on frame length when there is at least one frame stored in the upstream intermediate buffer; and
  an upstream multiplexer configured to selectively read frames from the frame insertion queue or upstream intermediate buffer at the request of the frame insertion queue or upstream intermediate buffer to transfer the frames to the upstream output buffer.

29. An Ethernet Passive Optical Network (EPON) bridge apparatus for executing bridging between a network port and a PON port including a plurality of logical ports via Logical Link Identifier (LLID) assigned to each Optical Network Unit (ONU), comprising:
  an FDB table configured to keep a MAC address associated port information for the kept MAC addresses, and an LLID value corresponding to the MAC address when the port is in a PON side;
  a VID-LLID conversion table configured to keep an LLID value to be attached to a downstream frame according to an input VID value;
  a LLID-VID conversion table configured to keep a VLAN tag value to be added according to an input LLID for an upstream frame;
  a multicast table configured to store registered multicast addresses for a downstream frame with an LLID value corresponding thereto;
  a downstream input buffer configured to store downstream frames inputted from the network port when the network port and the PON port are being bridged;
  a downstream input buffer configured to read a downstream frame stored in the downstream input buffer, record port information on a source MAC address of the downstream frame in the FDB table, refer to at least one of a destination MAC address and a VLAN tag of the downstream frame, search the FDB table, the VID-LLID conversion table, and the multicast table, selectively remove the VLAN tag, confirm a destination LLID and then attach the VLAN tag to the downstream frame to output;
  a downstream input buffer configured to store downstream frames inputted from the downstream frame processor until the downstream frames are transmitted to the PON port;
  an upstream input buffer configured to store upstream frames inputted from the PON port until the network port and the PON port are bridged;
  an upstream frame processor configured to read the upstream frame stored in the upstream input buffer, associate a source MAC address, a source LLID of the upstream frame and the PON port to record the information in the FDB table, refer to the FDB table, the LLID-VID conversion table, and the multicast table to send the frame to the destination port including the PON port after searching for the destination port or LLID value associated with the destination MAC address of the upstream frame, remove the LLID of the upstream frame and selectively attach a VLAN tag corresponding to the removed LLID to output the frame to an upstream output buffer; and
  the upstream output buffer configured to store upstream frames inputted from the upstream lookup and learner until the upstream frames are outputted to the network port.

30. The EPON bridge apparatus according to claim 29, further comprising a reflection output buffer configured to store an upstream frame outputted from the upstream frame processor and then output the stored frame to the PON port when downstream transmission is selected,
  wherein the upstream frame processor is configured to attach a destination LLID obtained by referring to the FDB table or the multicast table to the upstream frame, and output the upstream frame to the reflection output buffer, when the destination MAC address of the upstream frame is present in the PON port.

31. The EPON bridge apparatus according to claim 30, wherein the upstream frame processor is configured to, when the destination MAC address of the inputted upstream frame is present in the PON port, and a searched destination LLID and source LLID in the upstream frame are identical, discard the corresponding upstream frame.

32. The EPON bridge apparatus according to claim 30, wherein the upstream frame processor is configured to, when the destination MAC address of the inputted upstream frame is not registered on the FDB table, attach an anti-LLID corresponding to an existing LLID to the upstream frame to output the upstream frame to the reflection output buffer while sending the frame to the upstream output buffer after removing the LLID.

33. The EPON bridge apparatus according to claim 30, wherein the VID-LLID conversion table further comprises information indicating whether or not the VLAN tag addition in the upstream and the VLAN tag removal in the downstream is to be done in the ONU side for each of a registered VID,
- wherein the upstream/downstream frame processor is configured to forward the downstream frame without removing a VLAN tag and forward the upstream frame without adding ua VLAN tag when the VLAN tag is set up to be maintained for the VID.

34. The EPON bridge apparatus according to claim 30, further comprising:
- a frame extraction queue configured to store a frame to be processed by a CPU among downstream frames, inform the CPU of every frame stored through an interrupt, provide the number and lengths of the stored frames to the CPU enabling the CPU to read the frames;
- a frame insertion queue configured to store the frame outputted from CPU, and when a frame is stored in the frame insertion queue, issue a read request; and
- a processor interface configured to interface to enable the external CPU to insert a frame into the frame extraction queue or the frame insertion queue and extract a frame from the frame extraction queue or the frame insertion queue,
- wherein the downstream lookup and learner is configured to extract a frame destined to the CPU among the downstream frames read by the downstream input buffer and send the same to the frame extraction queue.

35. The EPON bridge apparatus according to claim 34, further comprising:
- an upstream intermediate buffer configured to store frames outputted from the upstream lookup and learner or the upstream VLAN tag processor until the frames are transmitted to the network port, and when there is a frame stored in the upstream intermediate buffer, output a read request along with information on frame lengths; and
- an upstream multiplexer configured to selectively read a frame from the frame insertion queue or upstream intermediate buffer at the request of the frame insertion queue or upstream intermediate buffer to transfer the frame to the upstream output buffer.

* * * * *